(12) United States Patent
Vosseler

(10) Patent No.: US 9,043,084 B2
(45) Date of Patent: May 26, 2015

(54) METHOD FOR CONFIGURING A CONTROL APPARATUS FOR A MOTOR VEHICLE, COMPUTER PROGRAM AND CONTROL APPARATUS

(75) Inventor: Wilfried Vosseler, Bräunlingen (DE)

(73) Assignee: Continental Automotive GmbH, Hannover (DE)

( * ) Notice: Subject to any disclaimer, the term of this patent is extended or adjusted under 35 U.S.C. 154(b) by 23 days.

(21) Appl. No.: 14/000,847

(22) PCT Filed: Feb. 21, 2012

(86) PCT No.: PCT/EP2012/052891
§ 371 (c)(1),
(2), (4) Date: Aug. 21, 2013

(87) PCT Pub. No.: WO2012/113766
PCT Pub. Date: Aug. 30, 2012

(65) Prior Publication Data
US 2013/0332006 A1    Dec. 12, 2013

(30) Foreign Application Priority Data

Feb. 23, 2011    (DE) .......................... 10 2011 012 187

(51) Int. Cl.
G06F 7/00    (2006.01)
G06F 9/44    (2006.01)
B60W 50/00    (2006.01)
G06F 9/445    (2006.01)
H04L 29/08    (2006.01)

(52) U.S. Cl.
CPC ................. *G06F 8/30* (2013.01); *B60W 50/00* (2013.01); *B60W 2050/0018* (2013.01); *G06F 9/44505* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,410,621 A * | 4/1995 | Hyatt ............................ | 382/260 |
| 6,076,622 A | 6/2000 | Chakraborty et al. | |
| 2001/0056318 A1 | 12/2001 | Tashiro et al. | |
| 2003/0078699 A1 | 4/2003 | Harms et al. | |
| 2005/0190101 A1* | 9/2005 | Hiramatsu et al. ............ | 342/175 |
| 2007/0142977 A1 | 6/2007 | Munoz | |

(Continued)

FOREIGN PATENT DOCUMENTS

| | | |
|---|---|---|
| DE | 101 29 921 A1 | 1/2002 |
| DE | 100 44 319 A1 | 3/2002 |
| DE | 103 34 536 A1 | 2/2004 |

(Continued)

*Primary Examiner* — Thomas Tarcza
*Assistant Examiner* — Adam Alharbi
(74) *Attorney, Agent, or Firm* — Cozen O'Connor

(57) ABSTRACT

A respective representation of signals from the control apparatus is provided for selection which has been prescribed as a first selection of signals for the control apparatus. At least two representations of program processes which can be executed concurrently can be produced. At least one of these representations is produced as a respective representation of an operating program process, and at least one of these representations is produced as a respective representation of a supplementary program process. Access by the at least one supplementary program process is limited to the prescribed first selection of signals. Program code is produced based on the prescribed first selection of signals and the at least two representations produced for program processes which can be executed concurrently.

7 Claims, 2 Drawing Sheets

(56) References Cited

U.S. PATENT DOCUMENTS

| | | |
|---|---|---|
| 2008/0155405 A1 | 6/2008 | Lock et al. |
| 2011/0066814 A1 | 3/2011 | Narisawa et al. |

FOREIGN PATENT DOCUMENTS

| | | |
|---|---|---|
| DE | 10 2004 060 301 A1 | 6/2006 |
| DE | 10 2005 047 555 A1 | 4/2007 |
| JP | 08-201093 | 8/1996 |
| JP | 10-171632 | 6/1998 |
| JP | 2005-078466 | 3/2005 |
| JP | 2005-215595 | 8/2005 |
| JP | 2007-094577 | 4/2007 |
| JP | 2008-046959 | 2/2008 |
| JP | 2009-080566 | 4/2009 |
| JP | 2010-061324 | 3/2010 |
| JP | 2010-231809 | 10/2010 |

* cited by examiner

METHOD FOR CONFIGURING A CONTROL APPARATUS FOR A MOTOR VEHICLE, COMPUTER PROGRAM AND CONTROL APPARATUS

CROSS REFERENCE TO RELATED APPLICATIONS

This is a U.S. national stage of application No. PCT/EP2012/052891, filed on Feb. 21, 2012. Priority is claimed on German Application No. DE102011012187.0, filed Feb. 23, 2011, the content of which is incorporated herein by reference.

BACKGROUND OF THE INVENTION

1. Field of the Invention

The invention relates to a method for configuring a control apparatus for a motor vehicle, a computer program for configuring the control apparatus, and to the control apparatus.

2. Description of Prior Art

Manufacturers of superstructures for utility vehicles may need access to a drive train of the utility vehicle to be able to demand power from the internal combustion engine of the utility vehicle required for operating the superstructures. However, it is complex and expensive to implement a controller of the drive train required for operating the superstructures.

SUMMARY OF THE INVENTION

An object of one embodiment of the invention is to create a method and a computer program that provides for simple configuring of a control apparatus. It is also an object of one embodiment of the invention to create a control apparatus which can be extended in a simple manner and which is reliable.

According to one embodiment of the invention is a method for configuring a control apparatus for a motor vehicle and a corresponding computer program. A respective representation of signals from the control apparatus is provided for selection and a completed selection is predetermined as a predetermined first selection of signals from the control apparatus. At least two representations of program processes that can be executed concurrently can be generated. At least one of these representations is generated as a respective representation of an operating program process and at least one of these representations is generated as a respective representation of a supplementary program process. An access of the at least one supplementary program process is restricted to the predetermined first selection of signals from the control apparatus. Furthermore, program code, which can be executed on the control apparatus, is generated based on the predetermined first selection of signals from the control apparatus and in dependence on the generated at least two representations of program processes that can be executed concurrently. The computer program comprises program instructions which perform the above steps during their execution on a computer. Furthermore, the computer program is preferably formed on a computer-readable medium.

The program code, which can be executed on the control apparatus, is generated such that the program processes can be executed concurrently in the control apparatus and that the access to the signals from the control apparatus is restricted for the at least one supplementary program process in accordance with the predetermined first selection of signals from the control apparatus. Advantageously, the respective representation of signals from the control apparatus is also provided for selection and a respectively further completed selection is predetermined as a predetermined second selection of signals from the control apparatus to which an access of the at least one operating program process is restricted in each case.

An advantage is that a respective operating program that can be executed within the context of the at least one operating program process, and a respective supplementary program that can be executed in the context of the at least one supplementary program process are encapsulated in their respective program process. As a result, high safety and reliability are possible. As a result, the programs cannot impair themselves mutually in the case of faults. The respective operating program and the respective supplementary program can thus be operated largely independently of one another. Furthermore, a high degree of safety and reliability is possible due to the restriction of the access to the first selection of signals from the control apparatus for the at least one supplementary program process. As a result, the respective supplementary program cannot influence or impair, in particular, signals of the operating program that are not made up by the predetermined first selection of signals from the control apparatus. As a result, unauthorized manipulation and malfunction of the control apparatus by the respective supplementary program are avoided, which supplementary program runs in the context of the at least one supplementary program process.

In one advantageous embodiment, the generating of the program code, which can be executed on the control apparatus, comprises generating an installation function for at least one supplementary program of a third-party manufacturer that can be executed in the context of the at least one supplementary program process on the control apparatus, for enabling a subsequent installation of the at least one supplementary program by a third party independently of at least one operating program, which can be executed in the context of the at least one operating program process on the control apparatus. As a result, for example, the third-party manufacturer that provides the at least one supplementary program can implement and/or alter the at least one supplementary program in the control apparatus independently of a vehicle manufacturer or a manufacturer of the control apparatus who manufactures the at least one operating program and implements it in the control apparatus. Thus, responsibility for any malfunctions of the at least one operating program or of the at least one supplementary program can be assigned more easily, for example to the vehicle manufacturer or to the third-party manufacturer.

In a further advantageous embodiment, a cycle time and/or a priority can be specified for executing the respective supplementary program process. The cycle time and/or priority specified in each case is allocated to the respective supplementary program process via the respectively associated representation. The program code is generated dependently on the associated cycle time and/or priority such that the respectively supplementary program processes can be executed with this cycle time or priority, respectively, in the control apparatus. An advantage is that computing power, used maximally by the respective supplementary program process executing the at least one supplementary program can be specified or controlled. With a suitable specification of the cycle time and/or the priority, the respective supplementary program process of the respective supplementary program cannot impair the execution of the at least one operating program process of the respective operating program. As a result, a deterministic and especially safe and reliable operation of the control apparatus is possible.

In a further advantageous embodiment, the control apparatus comprises, in at least one data memory, at least one common data memory area for storing the predetermined first selection of signals from the control apparatus and the access of the at least one supplementary program process to the at least one data memory is restricted to the common data memory area. An advantage is that the respective supplementary program only has restricted access to the signals from the control apparatus so that motor vehicle functions can be protected by this restriction against access by the at least one supplementary program. This provides for high safety and reliability of the control apparatus. Motor vehicle functions can thus be protected against unauthorized use or misuse by the at least one supplementary program or malfunction of the at least one supplementary program.

According to one embodiment of the invention a control apparatus controls at least one motor vehicle function in a motor vehicle. The control apparatus comprises at least one data memory and at least one computing device. The control apparatus is designed for storing at least one supplementary program of a third-party manufacturer in the at least one data memory independently of at least one operating program which, is stored in the at least one data memory. Furthermore, the control apparatus is designed for the concurrent execution of the at least one supplementary program by the at least one computing device in the context of a supplementary program process in addition to at least one operating program process within the context of which the at least one operating program can be executed. Access of the at least one supplementary program process is restricted to a predetermined first selection of signals from the control apparatus.

Advantages and advantageous embodiments and their advantages essentially correspond to those which are mentioned with reference to the first aspect.

BRIEF DESCRIPTION OF THE DRAWINGS

Exemplary embodiments of the invention will be explained in the text which follows with reference to the diagrammatic drawings, in which.

DETAILED DESCRIPTION OF THE PRESENTLY PREFERRED EMBODIMENTS

Elements of the same construction or function are provided with the same reference symbols in all figures.

Figure 1:
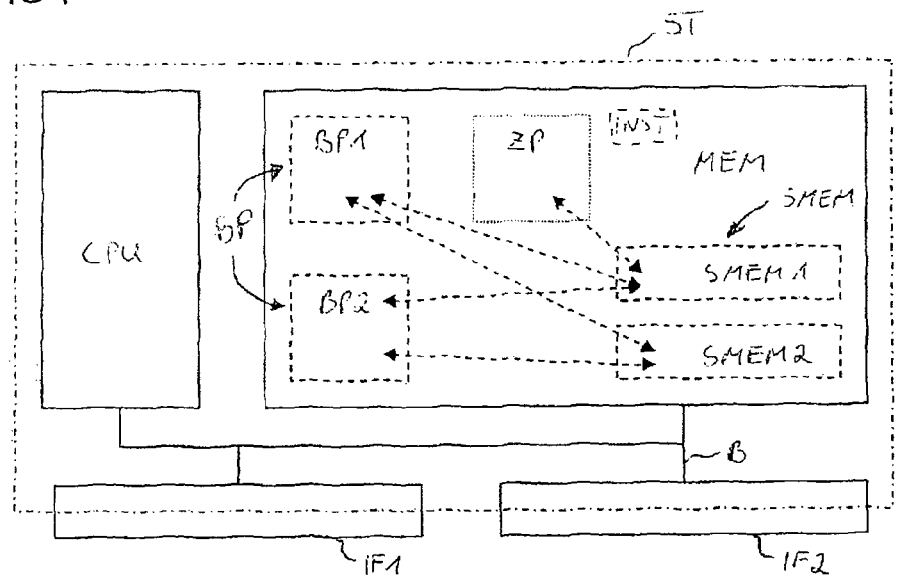
FIG. 1 is a control apparatus.

A control unit ST comprises at least one computing device CPU and at least one data memory MEM (FIG. 1). The at least one computing device CPU is, for example, designed in each case as a microprocessor or as a microcontroller. The at least one data memory MEM comprises, for example, at least one volatile memory and/or at least one non-volatile memory. The control apparatus ST also comprises at least one first hardware interface IF1 for coupling to external devices, for example at least one sensor and/or actuator and/or at least one further control apparatus ST. The control apparatus ST comprises preferably also at least one second hardware interface IF2 for coupling to external devices, for example at least one sensor and/or actuator and/or at least one further control apparatus ST. The at least one computing device CPU, the at least one data memory MEM, the at least one first hardware interface IF1 and the at least one second hardware interface IF2 are preferably coupled to one another via a databus B.

The at least one first hardware interface IF1 is preferably designed as a vehicle databus interface, for example for a "Controller Area Network" or, in brief: CAN. The at least one second hardware interface IF2 is preferably designed for coupling to external sensors and/or actuators. The control apparatus ST is designed and provided especially for installation in a motor vehicle and especially for installation in a utility vehicle. The control apparatus ST can also be designated as controller. The control apparatus ST is designed especially for controlling at least one motor vehicle function in the motor vehicle or utility vehicle, for example for controlling an internal combustion engine of the motor vehicle or utility vehicle or for controlling another component of a drive train of the motor vehicle or utility vehicle.

For example, the control apparatus ST is provided for a utility vehicle comprising a superstructure of a third-party manufacturer. A vehicle manufacturer manufactures, for example, a chassis and delivers it to the third-party manufacturer who mounts the superstructure on the chassis. The superstructure can comprise, for example, a concrete mixer or a fire engine ladder. The chassis comprises especially the control apparatus ST configured by the vehicle manufacturer. Operating the respective superstructure requires, for example, access to the drive train in order to be able to demand, for example, power for operating the concrete mixer or for extending or retracting the fire engine ladder, and to be able to tap it off from the drive train. This is also called "power take-off control".

This access to the drive train takes place especially via the control apparatus ST.

In the at least one data memory MEM, at least one operating program BP is stored, for example a first operating program BP1 and a second operating problem BP2. The at least one operating program BP is preferably configured and implemented by the vehicle manufacturer and stored in the at least one data memory MEM. As an alternative, the at least one operating program BP can also be configured, implemented and stored in the at least one data memory MEM by a manufacturer of the control apparatus ST. The at least one operating program BP is provided especially for controlling the at least one motor vehicle function and especially for controlling the at least one motor vehicle function of the chassis and/or of the internal combustion engine and/or of the drive train. The at least one operating program BP is therefore generally not matched to a particular superstructure on the chassis but can be used unchanged with various superstructures.

For controlling functions of the respective superstructure, at least one supplementary program ZP can be stored in the at least one data memory MEM, which supplementary program is generally developed and implemented by the third-party manufacturer or by a further third-party manufacturer acting on behalf of or on instruction by the third-party manufacturer and which is preferably specifically matched to the respective superstructure or its type. In general, the vehicle manufacturer and the manufacturer of the control apparatus ST are not significantly involved in the development or implementation of the at least one supplementary program ZP.

In order to be able to guarantee the safety and reliability of the control apparatus ST and of the motor vehicle, measures must be taken to prevent errors of the supplementary program ZP have a negative effect in this respect.

Therefore, in particular, only certain signals SIG from the control apparatus ST should be available to the at least one supplementary program ZP. Furthermore, the at least one supplementary program ZP should be executable and able to be installed largely independently of the at least one operating program BP so that the third-party manufacturer can install, store, or modify his respective supplementary program ZP independently of the vehicle manufacturer or the manufacturer of the control apparatus ST in the at least one data memory MEM. As a result, it should not be possible to impair the operation of the at least one operating program BP, as far as possible.

The control apparatus ST is designed to execute the at least one operating program BP and the at least one supplementary program ZP concurrently or in parallel in separate program processes. This is also called "multitasking" and the program processes are also called "task". In particular, at least one operating program process BPP is provided and at least one supplementary program process ZPP is provided. The at least one supplementary program ZP can be executed as part of the at least one supplementary program process ZPP and the at least one operating program BP can be executed as part of the at least one operating program process BPP. For example, the first operating program BP1 can be executed in a first operating program process BPP1 and the second operating program BP2 can be executed in a second operating program process BPP2.

Figure 2:
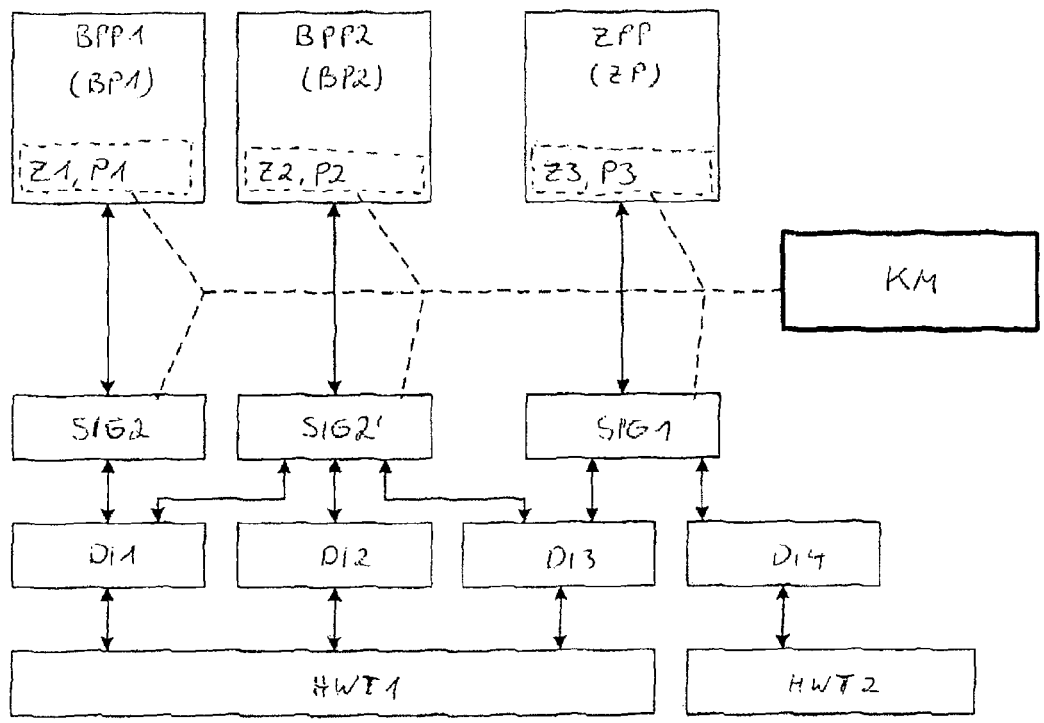
FIG. 2 is a configuration manager and representations of program processes and signals from the control apparatus.

To enable the third-party manufacturer to install or store or modify its respective supplementary program ZP independently of the vehicle manufacturer or the manufacturer of the control apparatus ST in the at least one data memory MEM and in order to be able to ensure that the safety and reliability of the control apparatus ST can not be endangered by the at least one supplementary program ZP, the control apparatus ST must be suitably configured. For this purpose, a configuration manager KM is provided which is designed preferably as a computer program for configuring the control apparatus ST but which can also be designed as a corresponding apparatus (FIG. 2). Furthermore, such an apparatus can also comprise the computer program. The configuration manager KM is designed to configure the program processes, that is to say the at least one operating program process BPP and the at least one supplementary program process ZPP, and to configure the signals SIG of the control apparatus ST to which, in particular, the access of the at least one supplementary program process ZPP should be restricted and to generate program code PROG executable on the control apparatus ST, which code can be stored in the at least one data memory MEM. Preferably, the configuration manager KM is also designed for assigning the at least one operating program BP to its respective operating program process BPP and for generating the program code PROG inclusive of the at least one operating program BP and, if necessary, also for assigning the at least one supplementary program ZP to its respective supplementary program process ZPP and for generating program code PROG of the at least one supplementary program ZP. The configuration manager KM is preferably part of a model-based development environment or the configuration manager KM comprises the model-based development environment.

FIG. 2 shows the configuration manager KM and representations of software components of the control apparatus ST. The software components can be executed as part of the program code PROG on the control apparatus ST. FIG. 2 shows, by way of example, a representation of the first operating program process BPP1, a representation of the second operating program process BPP2, and a representation of the at least one supplementary process ZPP. Furthermore, a selection of signals SIG form the control apparatus ST is allocated in each case to each of these program processes. The configuration manager KM preferably offers all available signals SIG from the control apparatus ST in the form of representations of the respective signals SIG from the control apparatus ST for selection, for example in the form of a selection list. Depending on a completed selection from all available signals SIG from the control apparatus ST, a predetermined first selection SIG1 of signals SIG from the control apparatus ST is predetermined by the configuration manager KM for the at least one supplementary program process ZPP. The predetermined first selection SIG1 of signals SIG from the control apparatus ST comprises, for example, a signal relating to an increase of an engine speed and/or return messages from vehicle functions, for example relating to an idling gearbox. Preferably, a predetermined second selection SIG2 and possibly also a further predetermined second selection SIG2' of signals SIG from the control apparatus ST is also predetermined for the respective operating program process BPP in dependence on a further completed selection from all available signals SIG of the control apparatus ST by the configuration manager KM.

The predetermined first selection SIG1 and the predetermined second selection SIG2 and possibly the further predetermined second selection SIG2' of signals SIG from the control apparatus ST can comprise corresponding signals SIG from the control apparatus ST. The predetermined first selection SIG1 and the predetermined second selection SIG2 and possibly the further predetermined second selection SIG2' of signals SIG from the control apparatus ST preferably comprise different combinations of signals SIG from the control apparatus ST.

The predetermined first selection SIG1 is preferably restricted with respect to the predetermined second selection SIG2 and the further predetermined second selection SIG2' of signals SIG from the control apparatus ST, that is to say the predetermined first selection SIG1 comprises preferably few signals SIG from the control device ST than the predetermined second selection SIG2 and the further predetermined second selection SIG2' of signals SIG from the control device ST and does not comprise especially preferred such signals SIG which are safety-critical or essential for the reliability of the control apparatus ST. the predetermined first selection SIG1 of signals SIG from the control apparatus ST comprises especially essentially only those signals SIG from the control apparatus ST that are mandatorily required for the operation of superstructures. The predetermined first selection SIG1 of signals SIG from the control apparatus ST is preferably predetermined by the vehicle manufacturer or the manufacturer of the control apparatus ST so that the third-party manufacturer can use only this predetermined first selection SIG1 of signals SIG from the control apparatus ST for his respective supplementary program ZP. The access to signals SIG from the control apparatus ST is thus restricted to the predetermined first selection SIG1 of signals SIG from the control apparatus ST for the at least one supplementary program process ZPP and for the respective supplementary program ZP. The access to signals SIG from the control apparatus ST, which are not comprised by the predetermined first selection SIG1, is not possible for the at least one supplementary program process ZPP and the respective supplementary program ZP. Correspondingly, such signals SIG from the control apparatus ST are protected from access by the at least one supplementary program process ZPP and the respective supplementary program ZP.

Such restricting of access can be implemented, for example, by providing at least one common data memory area SMEM. Such a common data memory area SMEM can also be called "shared memory". For example, a first common data memory area SMEM1 is provided for storing the signals SIG from the control apparatus ST in accordance with the predetermined first selection SIG1 of signals SIG from the control apparatus ST. The access of the at least one supplementary program process ZPP and of the respective supplementary program ZP is restricted to this first common data memory area SMEM1. As a result, a type of "firewall" is formed. For other signals SIG from the control apparatus ST, which are not comprised by the predetermined first selection SIG1 of signals SIG from the control apparatus ST, at least one further common data memory area can be provided, for example a second common data memory area SMEM2. It can also be provided that a respective common data memory area SMEM is allocated to each program process, in which the signals SIG from the control apparatus ST can be stored in accordance with the respective predetermined selection of the signals SIG from the control apparatus ST. However, the access of the at least one operating program process BPP and of the respective operating program BP does not generally have to be restricted to one of the common data memory areas SMEM so that these can also access, for example, the first common data memory area SMEM1.

To safeguard the operational reliability of the control apparatus ST, it is also advantageous to assign to the respective program process and especially to the at least one supplementary program process ZPP a cycle time Z and/or a priority P with which the respective supplementary program process ZPP and thus the respective supplementary program ZP can be executed. By predetermining the cycle time Z and/or the priority P, it can be reliably prevented that the at least one supplementary program process ZPP and the respective supplementary program ZP prevent or impair the executing of the at least one operating program process BPP and of the respective operating program BP in that the at least one supplementary program process ZPP and the respective supplementary program ZP claim for themselves too large a proportion of the overall computing power available in the control apparatus ST. By predetermining the cycle time Z and/or the priority P, a proportion of the available computing power can thus essentially be predetermined for the at least one supplementary program process ZPP and the respective supplementary program ZP. Preferably, a respective cycle time Z and/or priority P can also be predetermined for the at least one operating program process BPP and the respective operating program BP. The respective cycle time Z and/or priority P can be predetermined by the configuration manager KM and is allocated by the latter to the representation of the respective program process. For example, the first cycle time Z1 and/or a first priority P1 is allocated to the first operating program process BPP1 by the configuration manager KM. For example, the first cycle time Z1 is 20 milliseconds. For example, a second cycle time Z2 and/or a second priority P2 is allocated to the second operating program process BPP2 by the configuration manager KM. For example, the second cycle time Z2 is 40 milliseconds. Furthermore, a third cycle time Z3 and/or a third priority P3 is allocated to the at least one supplementary program process ZPP by the configuration manager KM, for example. For example, the third cycle time Z3 is 100 milliseconds. However, the cycle times Z and/or priorities P can also be predetermined differently.

To be able to install the at least one supplementary program ZP independently of the at least one operating program BP and especially also subsequently by a third party, that is to say independently of the vehicle manufacturer and the manufacturer of the control apparatus ST, and to store it or modify it in the at least one data memory MEM, that is to say also especially to be able to perform updates of the at least one supplementary program ZP, it is preferably provided that during the generation of the program code PROG, an installation function INST is generated. The installation function INST is preferably stored in the at least one data memory MEM and can be executed by the at least one computing device CPU. The installation function INST can be utilized by the third party, for example by the third-party manufacturer or by a workshop.

The signals SIG from the control apparatus ST are provided, for example, by at least one software interface to the at least one hardware interface, especially to the first and the second hardware interface IF1, IF2. However, the signals SIG from the control apparatus ST can also relate to internal processes of the control apparatus ST and can be used, for example, also for signaling between various program processes. For example, a first software interface DI1, a second software interface DI2, a third software interface DI3 and a fourth software interface DI4 are provided. However, more or fewer than the software interfaces mentioned can be provided. The respective software interface is provided especially for signal editing and signal processing. For example, at least one of the software interfaces is provided for evaluating messages which are received via the vehicle databus. For example, these messages are dissected and useful information transported in these is allocated to the relevant signals SIG of the control apparatus ST. Correspondingly, a respective message can be generated, in reverse if necessary, depending on signals SIG from the control apparatus ST and transmitted via the vehicle databus. For this purpose, the respective software interface communicates with at least one hardware driver, for example a first hardware driver HWT1 and a second hardware driver HWT2. The first hardware driver HWT1 is allocated, for example, to the first hardware interface IF1 and enables the first hardware interface IF1 to be operated. Correspondingly, for example, the second hardware driver HWT2 is allocated to the second hardware interface IF2 and enables the second hardware interface IF2 to be operated.

The at least one software interface and the at least one hardware driver are predetermined, for example, by the manufacturer of the control apparatus ST and correspondingly designed to be suitable for the control apparatus ST. The associated software components are taken into consideration in the generation of the program code PROG and integrated. By the at least one software interface, in particular, the signals SIG from the control apparatus ST, available overall in the control apparatus ST, are predetermined which are provided by the configuration manager KM for selection. Generating the program code PROG preferably comprises generating a memory map that especially comprises the at least one common data memory area SMEM and especially the first common data memory area SMEM1 and which, if necessary, also comprises the program code belonging to the at least one operating program BP and/or the installation function INST and the associated program code of the at least one software interface and of the at least one hardware driver. The memory map is stored preferably in the at least one data memory MEM of the control apparatus ST.

Figure 3:
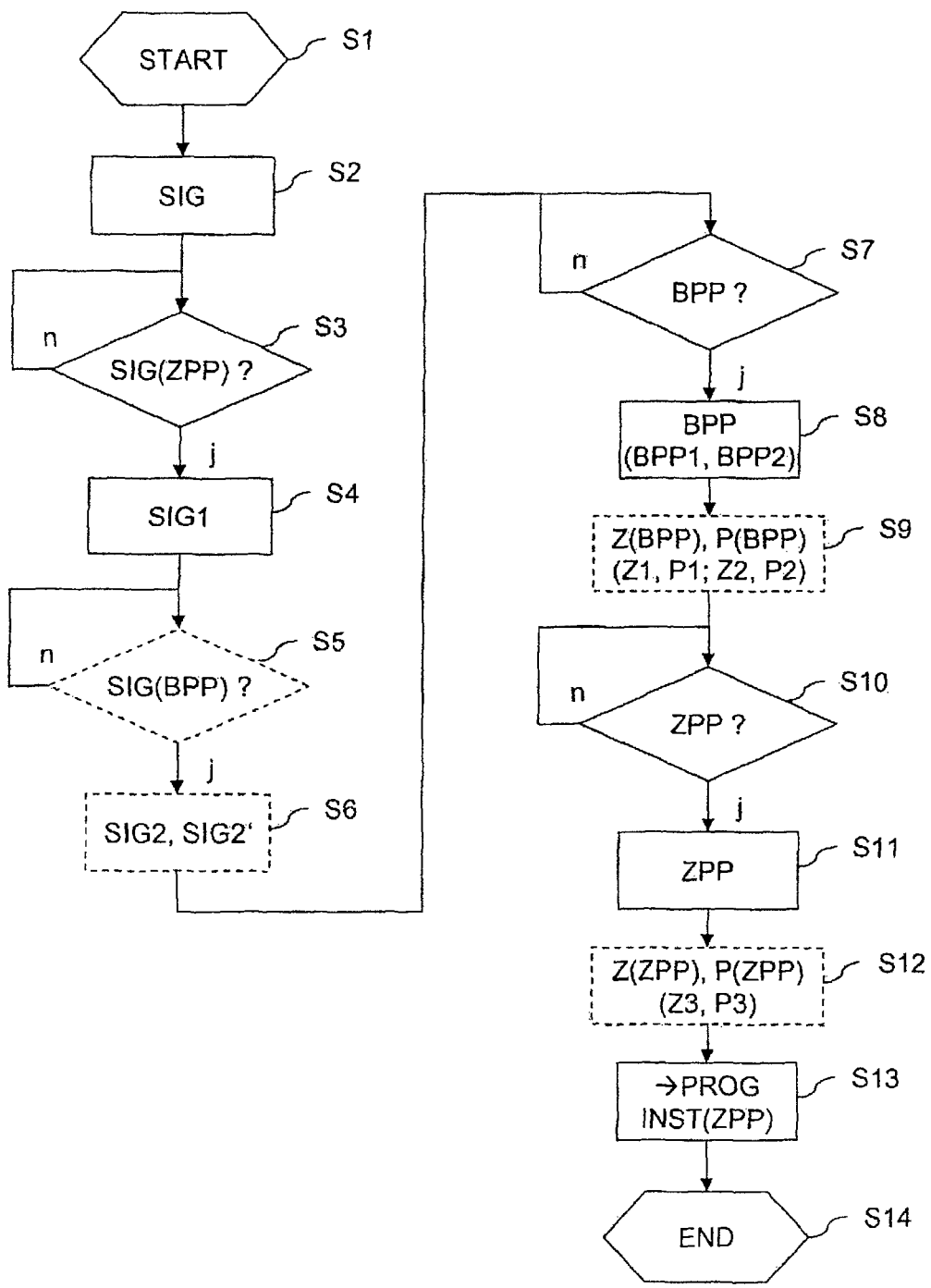
FIG. 3 is a flow chart.

FIG. 3 shows a flow chart of the computer program for configuring the control apparatus ST. The program starts in step S1 in which, for example, variables are initialized. In a step S2, the signals SIG from the control apparatus ST, available in the control apparatus ST, are provided for selection as their respective representation, for example in the form of the selection list. In a step S3, it is checked whether the selection has taken place. The completed selection is predetermined as the predetermined first selection SIG1 of signals SIG from the control device ST in a step S4. In a step S5 and a step S6 it can correspondingly be provided to predetermine the predetermined second selection SIG2 and possibly the at least one further predetermined second selection SIG2' of signals SIG from the control apparatus ST in dependence on a respective further completed selection from the signals SIG from the control apparatus ST, available in the control apparatus ST.

In a step S7, it is checked whether the generating of the representation of the at least one operating program process BPP has been chosen. If this has been chosen, the representation of the at least one operating program process BPP is generated in a step S8, for example of the first operating program process BPP1 or of the second operating program process BPP2. If necessary, the representation of the respective operating program BP is also allocated to the respective operating program process BPP, for example in the form of the respective source text or of the already precompiled associated program code. In a step S9, it can also be provided to allocate the cycle time Z and/or the priority P to the representation of the respective operating program process BPP.

In steps S10 to S12, the representation of the at least one supplementary program process ZPP is generated in accordance with steps S7 to S9. In step S10, it is checked in this respect whether generating the representation of the at least one supplementary program process ZPP has been selected. If this has been selected, the representation of the at least one supplementary program process ZPP is generated in step S11. In this process, the access of the at least one supplementary program process ZPP and of the supplementary program ZP which can be executed within its context to signals SIG of the control apparatus ST is restricted to the predetermined first selection SIG1 of signals SIG from the control apparatus ST. In step S12, it can also be provided to allocate to the representation of the at least one supplementary program process ZPP the cycle time Z and/or the priority P, especially the third cycle time Z3 and/or the third priority P3.

In a step S13, the program code PROG is generated in dependence on the predetermined first selection SIG1 and possibly on the predetermined second selection SIG2 and further predetermined second selection SIG2' of signals SIG from the control apparatus ST and in dependence on the at least one configured operating program process BPP and the at least one configured supplementary program process ZPP. Preferably, the program code PROG comprises the installation function INST for installing the at least one supplementary program and/or the memory map.

The program ends in a step S14. A sequence of the program processing can also be different. For example, steps S7 to S9 can be exchanged with steps S10 to S12 or steps S3 and S4 can be exchanged with steps S5 and S6. Similarly, steps S2 to S6 can be exchanged with steps S7 to S12, for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring a control apparatus for a motor vehicle, comprising:
providing a respective representation of signals from the control apparatus for selection, wherein a completed selection is determined as a first selection of signals from the control apparatus;
generating at least two representations of program processes that can be executed concurrently, wherein at least one of these representations is generated as a respective representation of an operating program process and at least one of these representations is generated as a respective representation of a supplementary program process;
restricting an access of the at least one supplementary program process to the predetermined first selection of signals from the control apparatus; and
generating program code configured to be executed on the control apparatus in dependence on the predetermined first selection of signals from the control apparatus and on the generated at least two representations of program processes that can be executed concurrently.

2. The method as claimed in claim 1, in which the generating of the program code which can be executed on the control apparatus comprises:
generating an installation function for at least one supplementary program of a third-party manufacturer, which can be executed in a context of the at least one supplementary program process on the control apparatus, to enable a subsequent installation of the at least one supplementary program by a third party independently of at least one operating program that can be executed in the context of the at least one operating program process on the control apparatus.

3. The method as claimed in claim 2, wherein at least one of a cycle time and a priority can be specified for executing the respective supplementary program process and the at least one of the cycle time and the priority specified in each case is allocated to the respective supplementary program process via the respectively associated representation.

4. The method as claimed in claim 2, wherein the control apparatus comprises at least one data memory having at least one common data memory area configured to store the predetermined first selection of signals from the control apparatus and the access of the at least one supplementary program process to the at least one data memory is restricted to the at least one common data memory area.

5. A computer program comprising program instructions which, when executed on a computer, perform the following:
providing a respective representation of signals from a control apparatus for selection wherein a completed selection is determined as a predetermined first selection of signals from the control apparatus;
generating at least two representations of program processes that can be executed concurrently, wherein at least one of these representations is generated as a respective representation of an operating program process and at least one of these representations is generated as a respective representation of a supplementary program process;
restricting an access of the at least one supplementary program process to the predetermined first selection of signals from the control apparatus; and
generating program code configured to be executed on the control apparatus in dependence on the predetermined first selection of signals from the control apparatus and on the generated at least two representations of program processes that can be executed concurrently.

6. The computer program as claimed in claim 5, stored on a nontransient computer-readable medium.

7. A control apparatus for controlling at least one motor vehicle function in a motor vehicle, which comprises at least one data memory and at least one computing device and which is configured to:
   store at least one supplementary program of a third-party manufacturer in the at least one data memory independently of at least one operating program that is stored in the at least one data memory; and
   concurrently execute the at least one supplementary program by the at least one computing device in a context of a supplementary program process in addition to at least one operating program process, within the context of which the at least one operating program can be executed,
   wherein access to the at least one supplementary program process is restricted to a predetermined first selection of signals from the control apparatus.

\* \* \* \* \*